(12) United States Patent
Johnson et al.

(10) Patent No.: US 8,038,754 B2
(45) Date of Patent: Oct. 18, 2011

(54) SYSTEMS AND METHODS FOR DELIVERING AIR TO VEHICLE ENGINES

(75) Inventors: Erik Scott Johnson, Snoqualmie, WA (US); Randy Dean Smithhisler, Edgewood, WA (US); Robert William Griffith, Jr., Kirkland, WA (US); Bryan Kelly Ross, Snoqualmie, WA (US)

(73) Assignee: PACCAR Inc, Bellevue, WA (US)

( * ) Notice: Subject to any disclaimer, the term of this patent is extended or adjusted under 35 U.S.C. 154(b) by 355 days.

(21) Appl. No.: 12/203,020

(22) Filed: Sep. 2, 2008

(65) Prior Publication Data

US 2010/0050865 A1    Mar. 4, 2010

(51) Int. Cl.
*B01D 46/00* (2006.01)
(52) U.S. Cl. .............. 55/385.3; 55/417; 55/484
(58) Field of Classification Search ..... 95/17; 55/385.3, 55/417, 484
See application file for complete search history.

(56) References Cited

U.S. PATENT DOCUMENTS

| 2,886,019 | A | 5/1959 | Stearns |
| 3,186,394 | A | 6/1965 | Ramun |
| 3,641,746 | A | 2/1972 | Smith |
| 3,989,186 | A | 11/1976 | McMichael |
| 4,103,656 | A | 8/1978 | Reddekopp |
| 4,273,564 | A | 6/1981 | Sugie |
| 4,632,084 | A | 12/1986 | Eriksson |
| 4,946,124 | A | 8/1990 | Peickert |
| 5,040,517 | A | 8/1991 | Cox |
| 5,046,473 | A | 9/1991 | Hokenson |
| 5,819,712 | A | 10/1998 | Cox |
| 5,899,196 | A | 5/1999 | Chite |
| 6,029,636 | A | 2/2000 | Kiel |
| 2005/0235942 | A1 | 10/2005 | McCullagh |

*Primary Examiner* — Duane Smith
*Assistant Examiner* — Tiffany Palmer
(74) *Attorney, Agent, or Firm* — Christensen O'Connor Johnson Kindness PLLC

(57) ABSTRACT

A system for delivering air to vehicle engines generally includes at least one air cleaner configurable to receive either conditioned air or unconditioned air and a conduit assembly coupled to the air cleaner for delivering cleaned air from the air cleaner to the vehicle engine.

7 Claims, 6 Drawing Sheets

SYSTEMS AND METHODS FOR DELIVERING AIR TO VEHICLE ENGINES

BACKGROUND

Combustion air directed into an internal combustion engine is generally directed through air cleaners before being directed into the engine compartment. In most climates, ambient air is a suitable source of combustion air. Therefore, air cleaners are generally manufactured with a perforated cap through which ambient air is received.

At extreme temperatures (for example, in extremely hot or cold climates), however, ambient air can be damaging to an internal combustion engine if used as combustion air. In addition, the ambient air source can become impeded or clogged by outside environmental conditions, such as snow, ice, and/or heavy dust conditions.

Therefore, there exists a need for switching the source of combustion air from ambient air to a conditioned air source, for example, warmed air delivered from the vehicle underhood area.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a system for delivering air to a vehicle engine is provided. The system generally includes first and second air cleaners in fluid communication with first and second air sources. The system further includes a conduit assembly coupled to the air cleaners for selectively delivering cleaned air from at least one of the first and second air cleaners to the vehicle engine.

In accordance with another embodiment of the present disclosure, an air diverter for an air cleaner is provided. The air diverter generally includes a cover for an air cleaner to prevent ambient air from entering the air cleaner when the cover is in place, the cover having an inlet therethrough. The air diverter further includes a duct coupled to the surface of the cover adjacent the inlet, the duct extending from the inlet to a source of air to deliver air from the source of air to the inlet. The air diverter further includes means for securing the cover to the air cleaner.

In accordance with yet another embodiment of the present disclosure, a system for delivering air to a vehicle engine is provided. The system generally includes an air cleaner configurable to receive either conditioned air or unconditioned air and a conduit assembly conduit to the air cleaner for delivering cleaned air from the air cleaner to the vehicle engine.

In accordance with yet another embodiment of the present disclosure, a method of delivering cleaned air to a vehicle engine is provided. The method generally includes delivering cleaned air to the vehicle engine from at least one of first and second air cleaners in fluid communication with first and second air sources, measuring air temperature, and depending on the temperature measured, controlling the apportionment of cleaned air delivered from first and second air cleaners to the vehicle engine.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
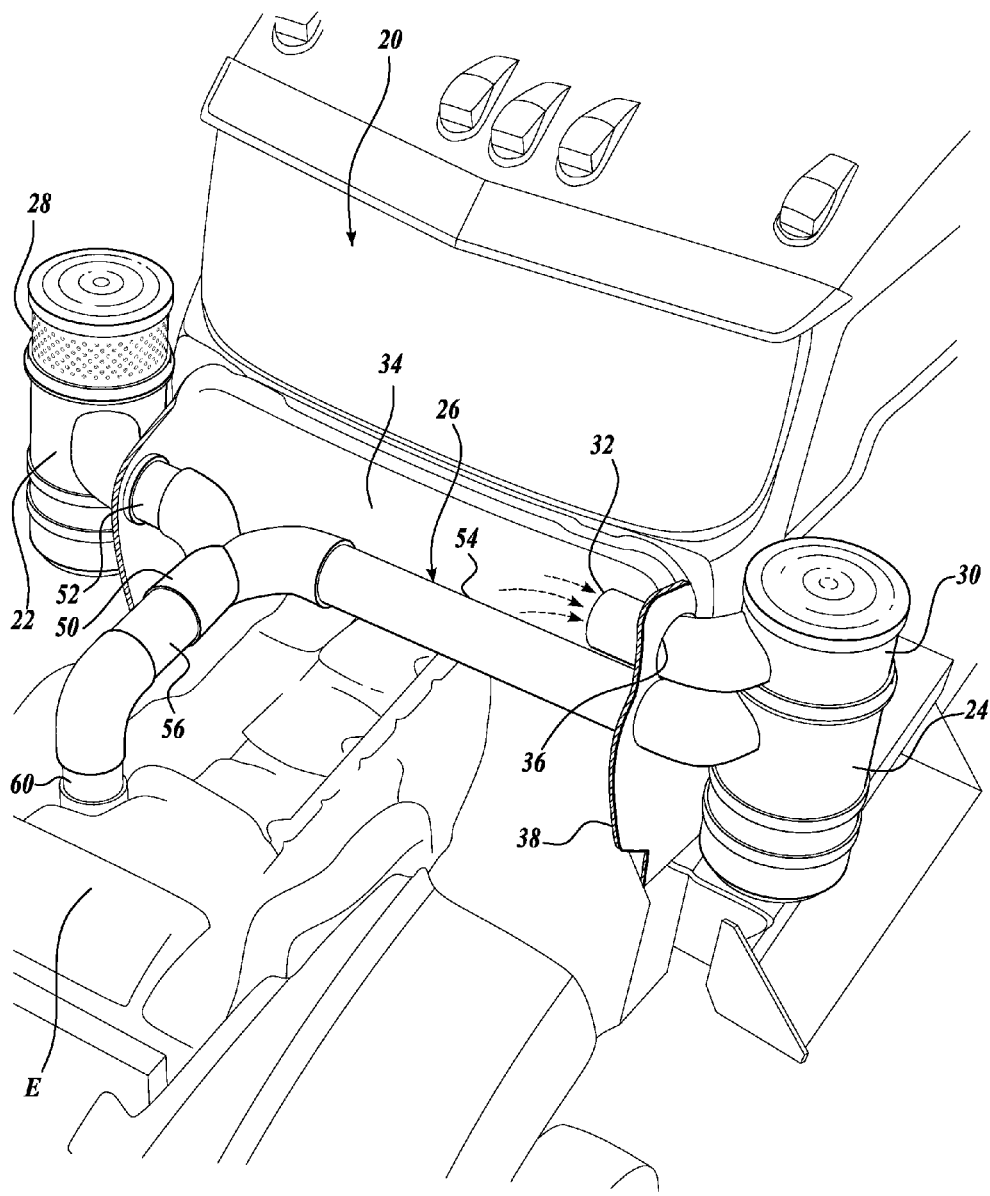
FIG. 1 is a perspective view of a vehicle including an engine air delivery system in accordance with one embodiment of the present disclosure.
Figure 2:
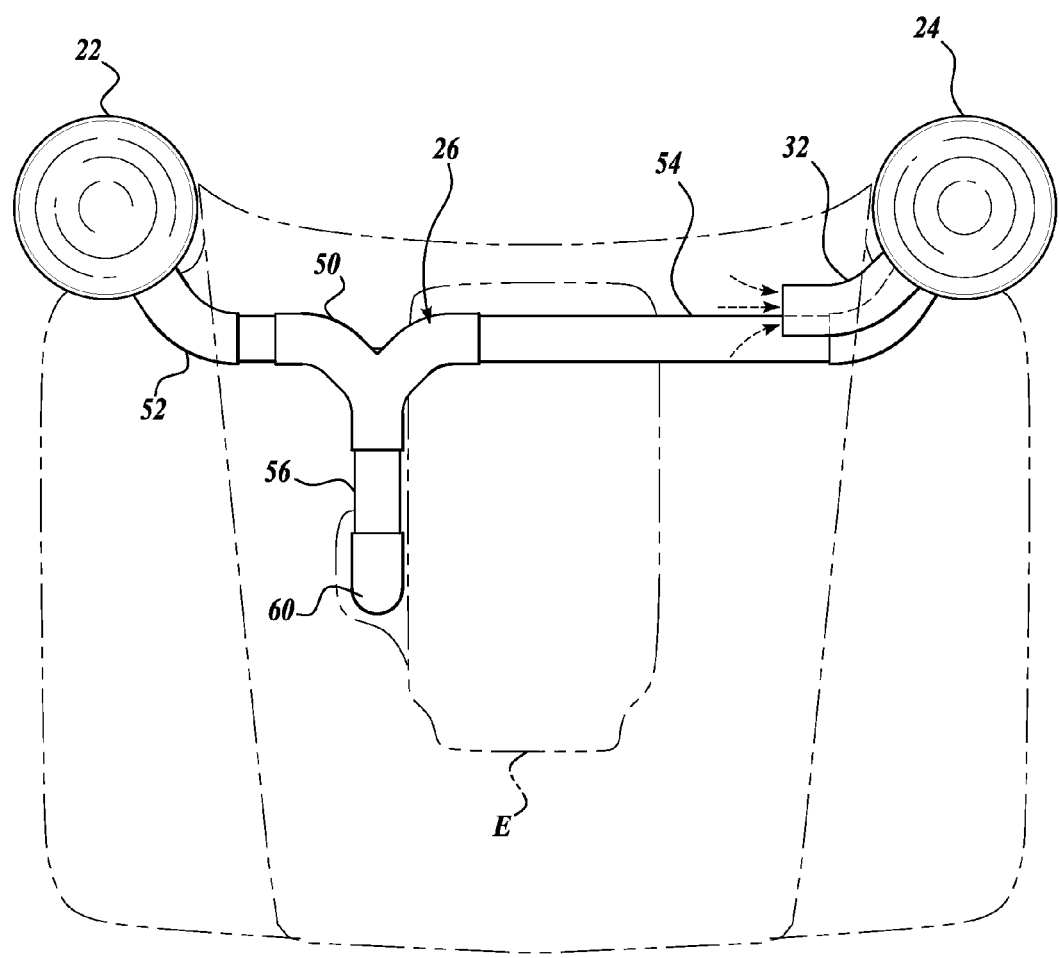
FIG. 2 is a top view of the air delivery system shown in FIG. 1.

Embodiments of the present disclosure are generally directed to air delivery systems for delivering air to vehicle engines and methods for delivering the same. Referring to FIGS. 1 and 2, there is shown an air delivery system, generally indicated 20, constructed in accordance with the one embodiment of the present disclosure. The system 20 generally includes first and second air cleaners 22 and 24 and a conduit assembly 26 coupled to the air cleaners 22 and 24 for delivering air from at least one of the first and second air cleaners 22 and 24 to the vehicle engine E. The system 20 therefore allows for selective delivery of air to the vehicle engine E from one or more different air sources, such as ambient air, conditioned air, or a mix of both.

Although shown and described herein as including first and second air cleaners 22 and 24, it should be appreciated that the system 20 may include more than two air cleaners. Moreover, although shown and described herein as cowl-mounted air cleaners 22 and 24, it should be appreciated that the air cleaners may be mounted in any suitable mounting location.

As best seen in FIG. 1, the first air cleaner 22 is shown as an air cleaner having a perforated cap 28, which allows ambient air to enter the air cleaner 22 and travel to the vehicle engine E. In that regard, the first air cleaner 22 is coupled to the conduit assembly 26 for delivery of the air to the engine E. As a non-limiting example, the first air cleaner may be a standard 15" ERA air cleaner. However, it should be appreciated that the first and second air cleaners may be selected from any standard or non-standard vehicle air cleaners or air filters.

Still referring to FIG. 1, as a non-limiting example, the second air cleaner 24 also may be a standard air cleaner, such a standard 15" ERA air cleaner. However, the second air cleaner 24 includes an air diverter, such as non-perforated cap 30 having an air inlet duct 32, wherein the inlet duct 32 is configured to be in fluid communication with a conditioned air source, such as cooled or heated air. In the illustrated embodiment, the inlet duct 32 is in fluid communication with an underhood area 34 of the vehicle, such that the air drawn into the second air cleaner 24 is heated air.

In one embodiment, the non-perforated cap 30 of the second air cleaner 24 may be a permanent cap 30. In another embodiment, as described in greater detail below, the non-perforated cap 30 of the second air cleaner 24 may be a temporary, removable cap that covers a standard perforated cap, such that the second air cleaner 24 may be converted to receive either conditioned air (when covered) or ambient air (when cap is removed). For example, during the warmer, dusty season, or in warmer climates, the non-perforated cap 30 of the second air cleaner 24 may be replaced with a perforated cap 28, such that both air cleaners 22 and 24 are operable to increase the flow of cleaned, ambient air in the air delivery system 20.

As seen in FIGS. 1 and 2, a cutout 36 through the vehicle hood or cowl panel 38 may provide access for the inlet duct 32 of the second air cleaner 24 from the underhood area 34 to a cowl-mounted air cleaner 24. Moreover, the inlet duct 32 is suitably designed and configured to duct warm, underhood air from the underhood area 34 to the second air cleaner 24. In that regard, the inlet duct 32 may be suitably manufactured from metal or high temperature plastic, and may be sized and configured to provide a suitable mass flow of air through the second air cleaner 24 to the engine E. In one non-limiting example, the inlet duct 32 is manufactured from a smooth and continuous material, such as a plastic or metal material, or any suitable combination thereof that is capable of ducting heated air. In one non-limiting example, the inlet duct 32 may be a thermoplastic polyester elastomer.

In addition, the inlet duct 32 is suitably sized and configured to provide a suitable mass flow of air through the second air cleaner 24 to the engine E, depending on the size of the air cleaner. In one embodiment, wherein the air cleaner is a 15" ERA air cleaner, the inlet duct 32 may have a flow area of about 10 to about 50 in$^2$, preferably about 20 to about 40 in$^2$ and more preferably about 25 to about 35 in$^2$.

Although shown in the illustrated embodiment as receiving heated air from the underhood area of the vehicle, it should be appreciated that the air delivery system 20 may be configured to receive air at the second air cleaner 24 from another conditioned air source, for example, other heated air sources besides the underhood area of the vehicle, such as a diesel particulate filter (DPF) enclosure, a selective catalytic reduction (SCR) enclosure, a muffler or exhaust system, or a cooled air source, such as a remote mounted cooler, or any other heated or cooled air source on the vehicle, or any combination thereof.

As mentioned above, the conduit assembly 26 provides for air delivery from one or both of first and second air cleaners 22 and 24 to the vehicle engine E at any given time. In the illustrated embodiment, the conduit assembly 26 is a converging conduit assembly, including, for example, a y-pipe 50 for combining a plurality of streams. In that regard, a first conduit 52 extends from the outlet of the first air cleaner 22 to the y-pipe 50, and a second conduit 54 extends from the outlet of the second air cleaner 24 to the y-pipe 50. Therefore, both conduits 52 and 54 converge into a third conduit 56, which extends from the y-pipe 50 to the air inlet 60 at the engine E.

Figure 3:
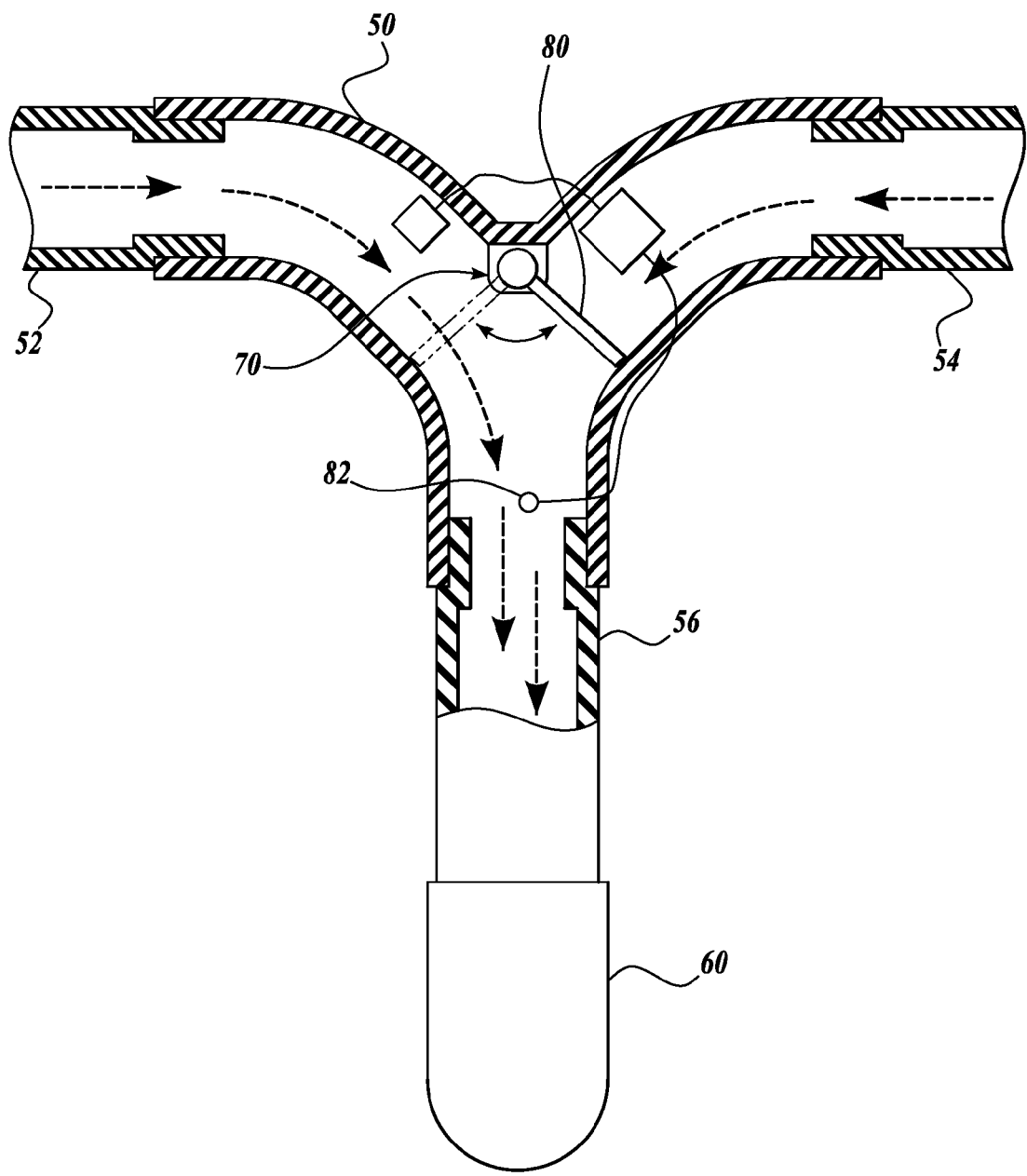
FIG. 3 is a top cross-sectional view of a conduit assembly for the air delivery system shown in FIG. 1.

Referring now to FIG. 3, the conduit assembly 26 may include a valve assembly 70 for selective delivery of cleaned air from one or both of first and second air cleaners 22 and 24 to the vehicle engine E at any given time. The valve assembly 70 controls air flow from the air cleaners 22 and 24 to the engine E to apportion the temperature and flow of the cleaned air to the engine E. As seen in the illustrated embodiment of FIG. 3, the valve assembly 70 may be a single servo valve design for selective delivery of cleaned air to the engine E. It should be appreciated, however, that the valve assembly 70 may be a dual servo valve design for selective delivery of cleaned air to the engine E.

As best seen in FIG. 3, in the single servo valve configuration, gate 80 can be positioned to control the air delivery from the air cleaners 22 and 24 to the engine E. For example, in one configuration, gate 80 may be positioned in a first position (see gate positioning in FIG. 3), substantially closing off the flow from conduit 54 and opening the flow from conduit 52. In another configuration, gate 80 may be positioned in a second position (see phantom lines for gate positioning in FIG. 3), substantially closing off the flow from conduit 52 and opening the flow from conduit 54. In yet another configuration, gate 80 may be positioned in a third position (any position between the first and second positions) to allow a portion of flow from conduit 52 and a portion of flow from conduit 54.

The valve assembly 70 may be manually operated by a vehicle operator or may be configured for automatic valve operation, triggered by temperature parameters. It should be appreciated, however, that an automatic system will preferably have an override feature. In the illustrated embodiment, a temperature sensor 82 is shown in the third conduit 56. However, it should be appreciated that temperature sensors may be suitably located in the first and second conduits 52 and 54 or in another location to measure ambient air temperature, either in lieu of or in addition to temperature sensor 82 in the third conduit 56.

As a non-limiting example of automatic value operation controlled by temperature parameters, the gate 80 may be biased to substantially close off flow from one of the conduits 52 or 54 depending on the temperature reading. For example, at an ambient temperature of 0 degrees C. or greater, the gate 80 may be positioned to substantially open flow from conduit 52, allowing ambient air to be directed to the engine E. At an ambient temperature below 0 degrees C., the gate 80 may be positioned to substantially open flow from conduit 54, allowing heated air to be directed to the engine E. It should further be appreciated that the logic for the temperature sensor control may also be configured to position the gate 80 for mixed air flows from both conduits 52 and 54.

Figure 4:
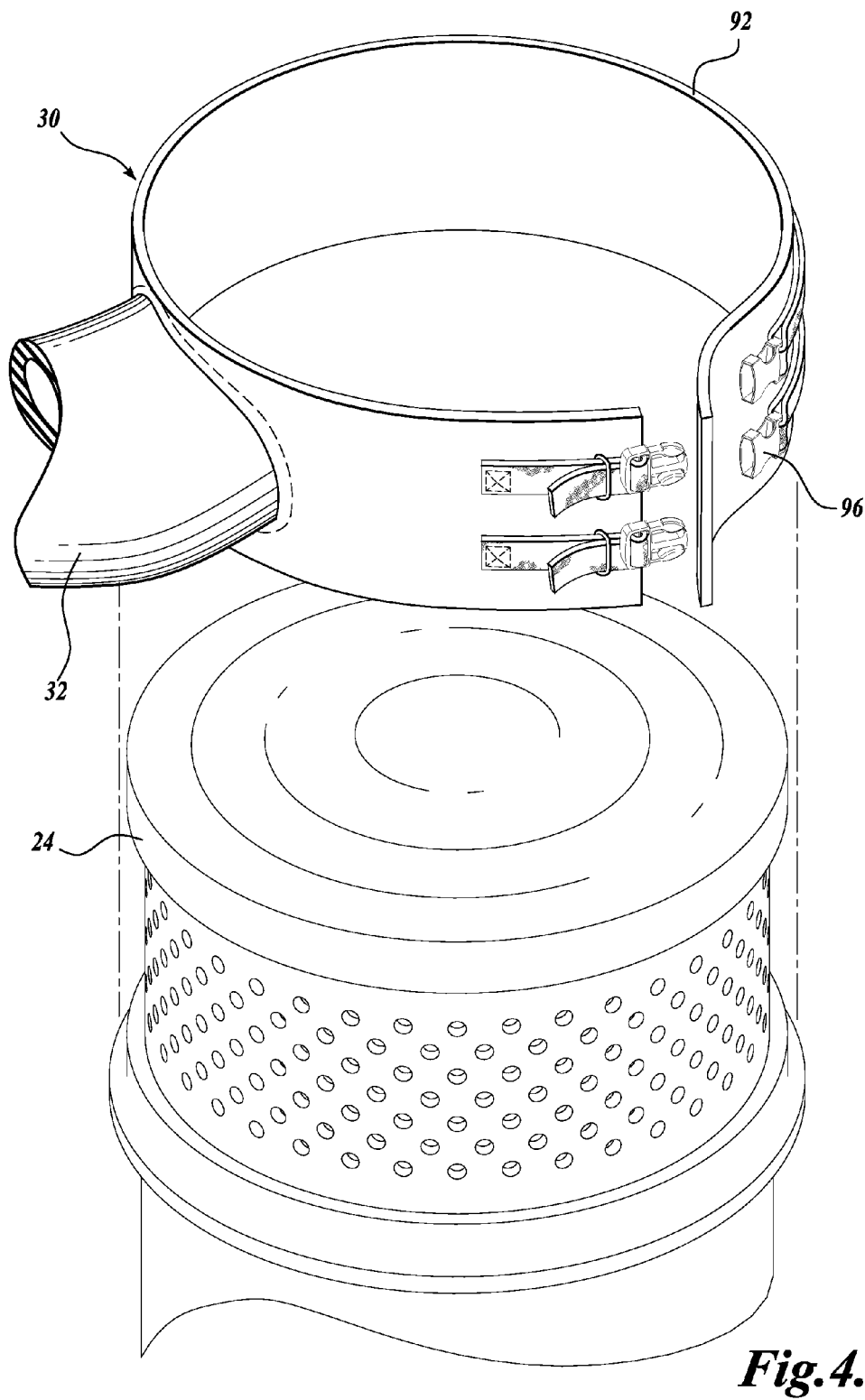
FIG. 4 is an exploded view of an air cleaner in the air delivery system shown in FIG. 1.
Figure 5:
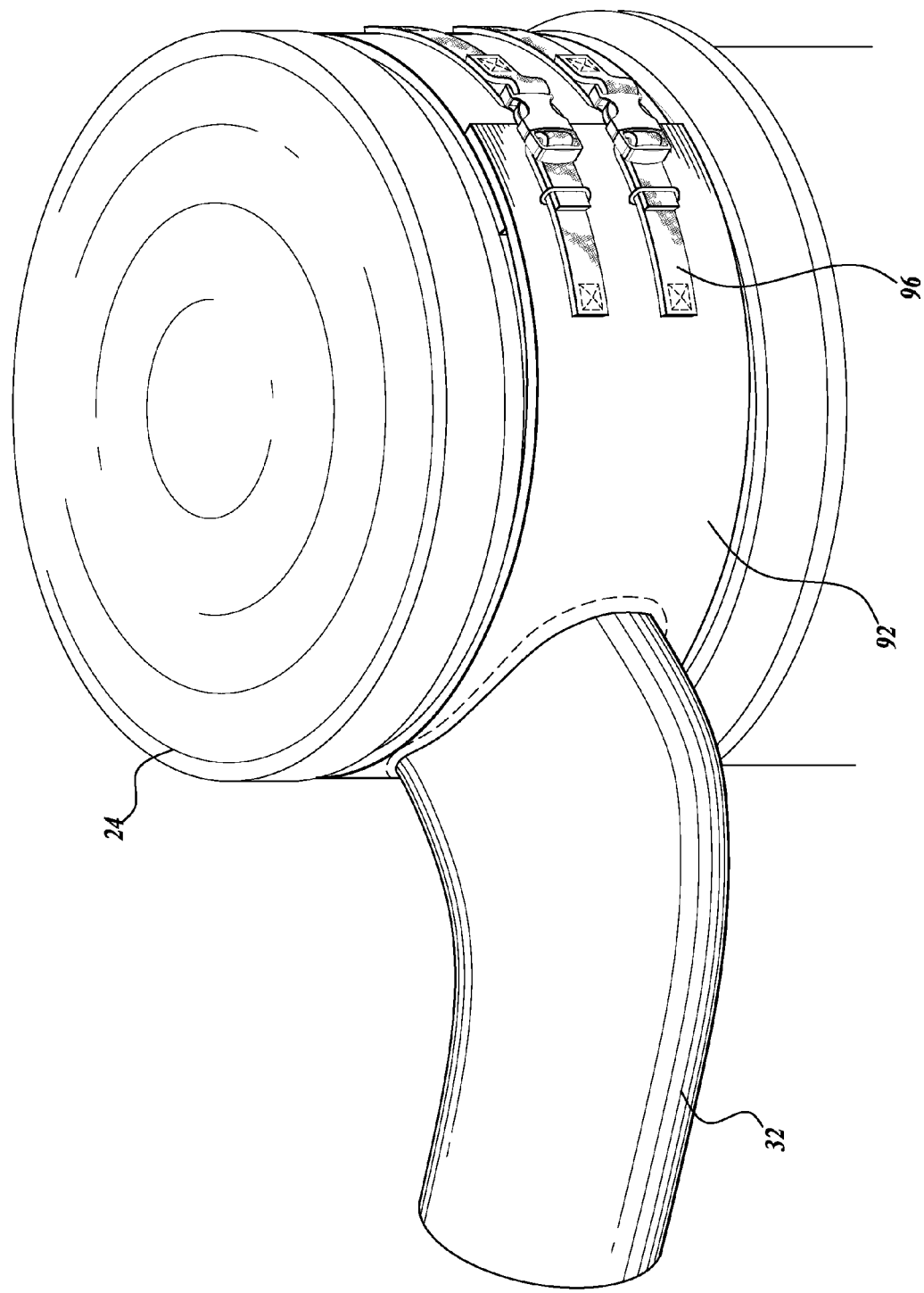
FIG. 5 is a perspective view of the air cleaner shown in FIG. 4.

Referring now to FIGS. 4 and 5, and as mentioned above, the system 20 may include a removable air diverter or non-perforated cap 30 for the second air cleaner 24. In the illustrated embodiment, a wrap-around non-perforated cap 30 is shown. The cap 30 generally includes an inlet duct 32 and a skirt 92. As described above, the inlet duct 32 is configured to be in fluid communication with the underhood area 34 to duct warm underhood air from the underhood area 34 to the second air cleaner 24. The skirt 92 is designed to cover the perforated cap of a standard air cleaner (for example, the first air cleaner 22, shown in FIG. 1) to prevent ambient air from entering the air cleaner 22. In that regard, the skirt 92 is suitably designed from a non-breathable material, such as a nylon reinforced vinyl fabric or other suitable material. It should be appreciated that the material for the skirt 92 may be a plastic, fabric, metal, or any suitable combination thereof.

The non-perforated cap 30 may further include means for securing the cover 30 to the air cleaner 24, such as a securement mechanism 96 for securely attaching the cap 30 to the second air cleaner 24. The means for securing the cover 30 to the air cleaner 24 may be releasable means. In the illustrated embodiment, the securement mechanism 96 includes one or more buckles and adjustable straps for securing the skirt 92 around the second air cleaner 24. Such a securement mechanism 96 may be adjustable for a variety of sizes of different air cleaners. Other suitable securement mechanisms may include hooks, belts, snaps, buttons, hook and look fasteners, and other mechanisms known and used in the art.

Advantages of the non-perforated cap 30 are that installation does not require any modifications to the air cleaner 24 or any installation hardware for mounting the cap 30 on the air cleaner 24. In addition, the cap 30 can be manually installed by a single vehicle operator if the climate conditions require that conditioned air, such as warmer, underhood air, be delivered to the engine E.

With reference to FIGS. 1-3, operation of the air delivery system 20 will now be described. Referring to FIGS. 1 and 2, when the vehicle engine E is in operation, air is drawn from air cleaners 22 and 24. Air cleaner 22 includes a perforated cap 28, such that air drawn into the inlet of the air cleaner 22 is at an ambient air temperature. Air cleaner 24 includes a non-perforated cap 30, such that air drawn into the inlet duct 32 of air cleaner 24 is conditioned air, for example, heated air for the underhood area 34 of the vehicle.

Referring now to FIG. 3, a valve assembly 70 selectively delivers cleaned air from one or both of the first and second air cleaners 22 and 24, depending on the temperature of the ambient air, as measured by the temperature sensor 82 or another ambient air temperature sensor (not shown). For example, at extremely cold ambient temperatures, the valve assembly 70 may selectively deliver only conditioned air (i.e., warm air) from air cleaner 24 to the vehicle engine E. At more moderate ambient temperatures, the valve assembly 70 may selectively deliver ambient air from air cleaner 22 to the vehicle engine E, or alternatively, a mix of ambient air and conditioned air from both air cleaners 22 and 24 to the vehicle engine E.

Moreover, as best seen in FIGS. 4 and 5, an operator may add or remove a removable non-perforated cap 30 depending on the temperature of the ambient air. For example, at cold ambient temperatures, the operator might place the removable non-perforated cap 30 on the air cleaner 24, such that air entering the inlet duct 32 is conditioned air, for example, for the underhood area 34 of the vehicle. At warmer ambient temperatures, the operator might remove the removable non-perforated cap 30 from the air cleaner 24, to increase the flow of cleaned ambient air to the vehicle engine E.

Now referring to FIG. 6, a system for delivering air to a vehicle engine in accordance with another embodiment of the present disclosure will be described in greater detail. It should be appreciated that the following system is substantially identical in materials and operation as the previously described embodiment, except for the difference regarding the number of air cleaners. For clarity in the ensuing descriptions, numeral references of like elements of the system 20 are similar, but are in the 100 series for the illustrated embodiment of FIG. 6.

Figure 6:
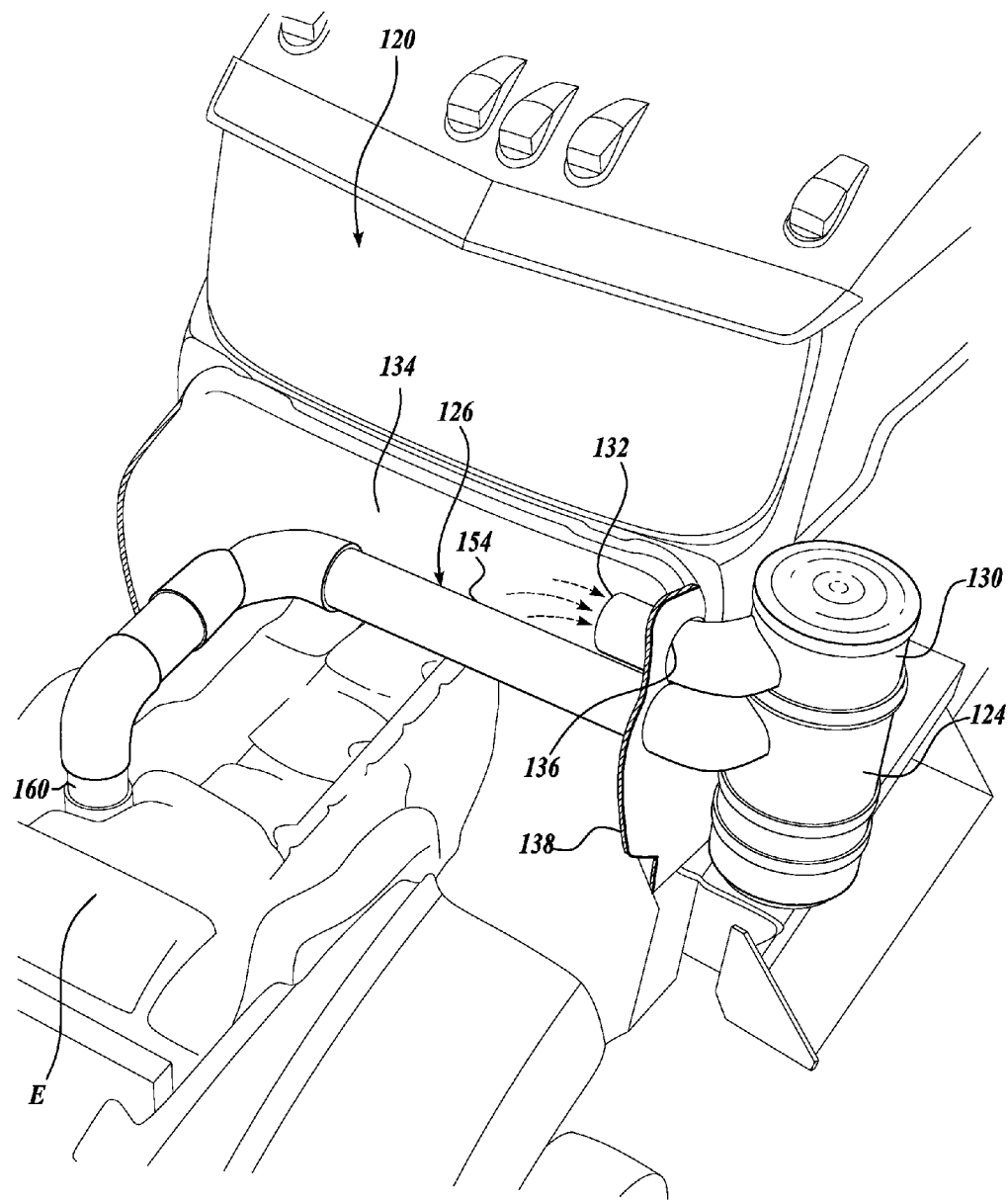
FIG. 6 is a perspective view of a vehicle including an engine air delivery system in accordance with another embodiment of the present disclosure.

In the illustrated embodiment of FIGS. 1-3, the system 20 includes first and second air cleaners 22 and 24; however, the system illustrated in FIG. 6 includes only one air cleaner 124 having a removable non-perforated cap 130, such that the air cleaner 124 can be configured to receive either conditioned or unconditioned air. One advantage of such a removable non-perforated cap 130 is that in a system 120 having only one air cleaner 124, the air cleaner 124 may be used to selectively deliver air to the vehicle engine E from more than one air source. In that regard, in moderate ambient temperatures, the cap 130 can be removed to deliver ambient air to the vehicle engine E. In more extreme hot or cold ambient temperatures, the cap 130 can be installed to deliver conditioned air to the vehicle engine E.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for delivering air to a vehicle engine, the system comprising:
   (a) first and second air cleaners normally configured for fluid communication with ambient air, wherein the first and second air cleaners have a plurality of perforations for ambient air intake;
   (b) a conduit assembly coupled to the air cleaners for selectively delivering cleaned air from at least one of the first and second air cleaners to the vehicle engine; and
   (c) a diverter selectively positionable on at least one of the first and second air cleaners, the diverter including an obstructing device for preventing ambient air intake at the plurality of perforations and an inlet duct in fluid communication with a source of conditioned air for delivering conditioned air to at least one of the first and second air cleaners.

2. The system of claim 1, wherein the conditioned air is heated or cooled air.

3. The system of claim 1, wherein the air source for the conditioned air is selected from the group consisting of an underhood area of the vehicle, a diesel particulate filter (DPF) enclosure, a selective catalytic reduction (SCR) enclosure, an exhaust system, a remote mounted cooler, and a combination thereof.

4. The system of claim 1, wherein the conduit assembly includes a valve assembly for apportioning cleaned air from at least one of the first and second air cleaners to the vehicle engine.

5. The system of claim 1, wherein the obstructing device selectively covers the plurality of perforations of the air cleaner to prevent ambient air from entering the air cleaner.

6. A system for delivering air to a vehicle engine, the system comprising:
   (a) at least one air cleaner normally configured for fluid communication with ambient air, wherein the at least one air cleaner has a plurality of perforations for ambient air intake;
   (b) a diverter selectively positionable on the at least one air cleaner, the diverter including an obstructing device for preventing ambient air intake at the plurality of perforations and an inlet duct in fluid communication with a source of conditioned air for delivering conditioned air to at least one of the first and second air cleaners; and
   (c) a conduit assembly coupled to the air cleaner for delivering cleaned air from the air cleaner to the vehicle engine.

7. A system for delivering air to a vehicle engine, the system comprising:
   (a) an air cleaner normally configured for fluid communication with ambient air, wherein the at least one air cleaner has a perforated cap for ambient air intake; and
   (b) a diverter selectively positionable on the at least one air cleaner, the diverter including a cover portion for preventing ambient air intake at the plurality of perforations and an inlet duct coupled to the cover portion for delivering conditioned air to the air cleaner.

\* \* \* \* \*